Figure 1:
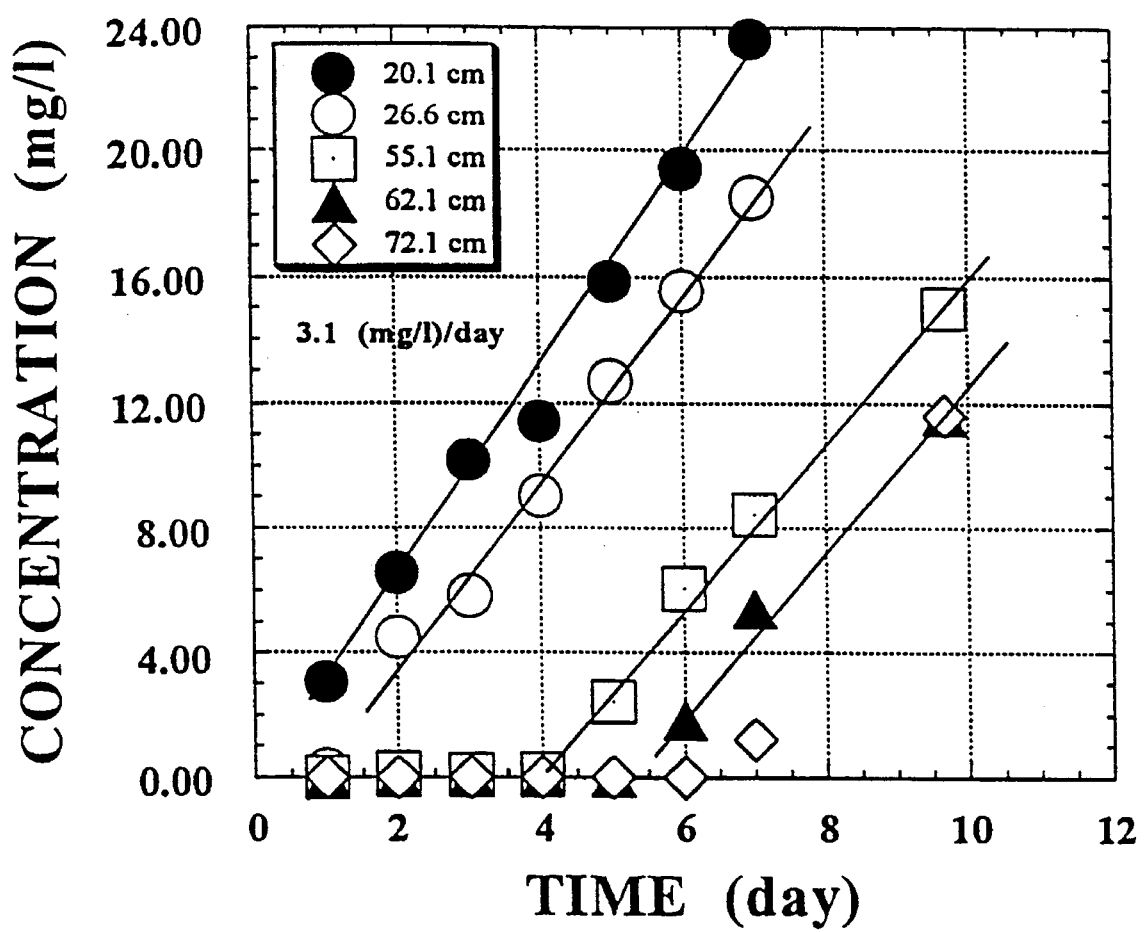

United States Patent [19]

Acar et al.

[11] Patent Number: 5,616,235
[45] Date of Patent: Apr. 1, 1997

[54] ELECTROCHEMICAL STABILIZATION OF SOILS AND OTHER POROUS MEDIA

[75] Inventors: Yalcin B. Acar; Robert J. Gale, both of Baton Rouge, La.

[73] Assignee: Board of Supervisors of Louisiana State University and Agricultural and Mechanical College, Baton Rouge, La.

[21] Appl. No.: 655,709

[22] Filed: Jun. 3, 1996

[51] Int. Cl.⁶ .................................................. C25C 1/22
[52] U.S. Cl. ......................... 205/766; 204/515; 204/450
[58] Field of Search ................................... 204/515, 450; 205/766

[56] References Cited

U.S. PATENT DOCUMENTS 5,137,608  8/1992  Acar et al. ............................... 204/130

FOREIGN PATENT DOCUMENTS 1-52906  3/1989  Japan .

OTHER PUBLICATIONS

Jacobs et al., "Model and Experiments on Soil Remediation by Electric fields," Sep. 1993.
Sutton et al., "Soil Improvement Committee–Admixtures Report" in a Symposium entitled Soil Improvement–A Ten year update Apr. 1987 pp. 120–135.
P. Madshus et al., "Improvement of Quick Clay by Electrolysis," Scandinavian Geotechnical Meeting, Sweden, Bulletin 17, Dept. of Geotechnical Engineering, Norwegian Institute of Technology (1984) (English Translation).
I. Casagrande, "Electro–osmosis in Soils," Geotechnique, vol. 1, pp. 159–177 (1949).
Acar et al., "Fundamentals of Extracting Species From Soils by Electrokinetics," Waste Mngmnt., vol. 13, pp. 141–151 (1993).
Soil Improvement: History, Capabilities, and Outlook, Amer. Soc. Civ. Eng., pp. 46–47 (Feb. 1978).

Soil Improvement Methods and Their Applications in Civil Engineering, Dept. Civ. Eng., North Carolina State University, Raleigh, NC, pp. 44–49, 56–59, 62–71 (1981).
Acar et al., "Electrokinetic remediation: Basics and technology status," J. Haz. Mat., vol. 40, pp. 117–137 (1995).
Segall et al., "Electroosmotic Contaminant–Removal Process," ASCE J. Env. Eng., vol. 118, pp. 84–100 (1992).
Oldham et al., *Materials Evaluated as Potential Soil Stabilizers*, Misc. Paper S–77–15, U.S. Army Engineer Waterways Experiment Station, pp. A7, A9, A132, A137, A189, and A194 (1977).

(List continued on next page.)

*Primary Examiner*—Arun S. Phasge
*Attorney, Agent, or Firm*—John H. Runnels

[57] ABSTRACT

Suitable electrolyte conditioning at the electrodes greatly facilitates the transport of desired ions through soil, enhancing the ability of electrokinetic processes to stabilize the soil through cementing reactions. Cationic species are injected at the anode, and anionic species at the cathode, with suitable electrolyte conditioning. For example, if acid or base formation negatively affects transport, chemical conditioning is used to neutralize the acid or base products of electrolysis. Ionic species can be transported through soil at rates of several centimeters a day, even in soils such as clays having a low hydraulic conductivity. Electroosmotic transport can be minimized by appropriate conditioning of the pore fluid chemistry. For example, placement of chemical conditioners with smaller cations at the anode compartment and larger anions at the cathode compartment, or increasing the ion content of the pore fluid (e.g. by acidification) can help minimize electroosmotic transport and any of its adverse effects on species transport. The cations and anions are preferably selected to form cementatious precipitates in the soil. Thus when cationic species are injected at the anode and anionic species are injected at the cathode, stabilization reactions can prevail in the soil as the result of cross-transport of species, and a homogenous and uniform cementation and stabilization can be achieved in a short time.

9 Claims, 2 Drawing Sheets

OTHER PUBLICATIONS

Sutton et al., "Soil Improvement Committee –Admixtures Report," pp. 121–125, 128–135 in Welsh (ed.) *Soil Improvement –A Ten Year Update* (1987).

van Impe, *Improvement Techniques and Their Evolution*, A.A. Balkema/Rotterdam/Brookfield, pp. 42–47, 89, 91, and 93 (1993).

Anderson, et al., Soil Improvement History, Capabilities, and Outlook, American Society of Civil Engineers, pp. 46–47, Feb., 1978.

*Soil Improvement—A Ten Year Update,* Geotechnical Special Publication No. 12, pp. 120–135, Apr., 1987.

Jacobs et al., *Model and Experiments on Soil Remediation by Electric Fields,* Presented at ACS Emerging Technologies in Hazardous Waste Management V, pp. 1–15, Sep. 1993.

ELECTROCHEMICAL STABILIZATION OF SOILS AND OTHER POROUS MEDIA

The benefit of the Jun. 8, 1995 filing date of provisional application nnnnn (which was a conversion of nonprovisional application 08/488,614) is claimed under 35 U.S.C. §119(e). The provisional application serial number is unavailable.

This invention pertains to methods of stabilizing soils and other porous media, particularly to methods of stabilizing soils through the use of electrochemical techniques.

Soil stabilization techniques are used when loads imposed by structures, or by the soil itself, cannot be supported by the underlying deposits. Soil stabilization techniques are also sometimes used when excessive settlement of soil is expected, or in regions where a soil failure could result: in loss of life or property.

Two general methods have been used to stabilize soils in the past: (1) the application of electric fields, and (2) the injection of chemical stabilizers.

1. Electrically-induced transport phenomena have been used to consolidate or "pre-compress" soils. See I. Casagrande, "Electro-osmosis in Soils," Geotechnique, vol. 1, pp. 159–177 (1949). The electrically-induced mechanisms include electromigration of ions, electrophoresis of charged species, and electroosmosis due to electromigration-induced pore fluid flow. In electroosmosis, the pore fluid moves due to the application of a constant, low DC current by electrodes inserted in soil. In the five decades since its first application in 1947, electro-osmosis has been used in applications such as (1) improving stability of excavations, (2) increasing pile strength, (3) stabilization of fine-grained soils, (4) dewatering of foams, sludges, and dredgings, (5) groundwater lowering and barrier systems, (6) chemical grout injection, (7) removal of metallic objects from the ocean sea bottom, (8) decreasing pile penetration resistance, (9) increasing petroleum production, (10) determination of volume change and consolidation characteristics of soils, (11) removal of easily water-soluble salts from agricultural soils, and (12) separation and filtration of certain materials in soils and solutions.

Consolidation or pre-compression of soils through electroosmosis is based on extraction of pore fluid in the soil with an electric potential applied between a closed anode and an open anode (i.e., an anode region where migrating water may flow out of the soil). Suction generated by the electroosmotic transport of the pore fluid decreases the void ratio of the soil, and can thereby cause settlement of the deposit. This higher density improves the soil characteristics, and reduces further settlement of structures placed in such deposits. This flow of pore fluid can also be used to stabilize slopes.

Electrokinetic techniques typically use a low-level DC electrical potential difference (on the order of a few volts per cm) or a low-level electrical current (on the order of milliamps per $cm^2$) applied across a soil mass by electrodes placed in an open or closed flow arrangement. Either the groundwater in the boreholes or an externally supplied fluid is used as the conductive medium. An "open" flow arrangement at the electrodes allows ingress and egress of the processing fluid or pore fluid.

The transport of species under electrical fields involves chemical reactions at the electrodes, chemical reactions in the soils, and various electric conduction phenomena in soils. The low-level current causes physico-chemical and hydrological changes in the soil mass, leading to species transport by coupled and uncoupled conduction phenomena in the porous media. Electrolysis reactions prevail at the electrodes. The species input into the system at the electrodes (either by electrolysis reactions, or by introduction of processing fluid), and the species in the pore fluid are transported across the porous media by conduction phenomena in soils under electric fields. This transport, coupled with sorption, precipitation and dissolution reactions comprise the fundamental mechanisms of electrokinetic reactions.

When electrodes are placed in a soil that contains groundwater, electrolysis reactions generate an acidic medium at the anode and an alkaline medium at the cathode. The pH drops at the anode to below about 2, and increases at the cathode to above about 12 depending upon the total current applied and the type of soil. The acid front formed at the anode advances towards the cathode by different transport mechanisms, including migration due to electrical gradients, pore fluid advection due to prevailing electroosmotic flow, any externally applied or internally generated hydraulic potential differences, and diffusion resulting from a generated chemical gradient. Unless the transport of this acid front is retarded by the buffering capacity of the soil, the chemistry across the specimen will be dominated by the transport of the hydrogen ion. The cation exchange capacity of the soil, the availability of organic species and salts (such as $CaCO_3$) that react with acid would affect the buffering capacity of the soil. Kaolinitic clay has a much lower buffering capacity compared with other clays such as montmorillonite or illite, due both to its lower cation exchange capacity and the naturally acidic nature of this clay.

Acar et al., "Fundamentals of Extracting Species From Soils by Electrokinetics," Waste Mngmnt., vol. 13, pp. 141–151 (1993) reported that in Georgia kaolinite the alkaline medium formed at the cathode initially advances towards the anode by ionic migration and diffusion; however, the mass transport of $H^+$ towards the cathode neutralizes this base front, veiling its transport towards the anode due to the faster transport of the $H^+$ ions. The acid generated at the anode advanced across the specimen without significant retardation, and neutralized base generated at the cathode, thereby lowering the effluent pH.

It has been reported that electroosmosis can facilitate the migration of chemical grouts through fine-grained soils. See *Soil Improvement: History, Capabilities, and Outlook*, Amer. Soc. Civ. Eng., pp. 46–47 (Feb. 1978).

*Soil Improvement Methods and Their Applications in Civil Engineering*, Dept. Civ. Eng., North Carolina State University, Raleigh, N.C., pp. 44–49, 56–59, 62–71 (1981) discloses electro-osmotic precompression of soil, electrochemical injection of fluids into soils, and other methods for stabilization of soils.

It has been reported that where a soil is dewatered by electro-osmosis, a dry zone occurs around the anode, and that soil near the anode can become impregnated with iron oxide. A reduction in dewatering and an accompanying decline in power consumption are caused by the development of concentration polarization at both electrodes. Over time, iron oxide fills voids and causes chemical cementation of pore spaces. Iron oxide cementation around the anode during electro-osmotic dewatering caused by the "dredging" of iron from groundwater can become so extensive that electro-osmotic currents are virtually shut off by the barrier formed around the anode.

U.S. Pat. No. 5,137,608 discloses the electrochemical decontamination of soil or slurries through the use of an inert electrode, a nonreactive cathode, and supplying water to the soil near the anode. See also Acar et al., "Electrokinetic remediation: Basics and technology status," J. Haz. Mat., vol. 40, pp. 117–137 (1995); and Acar et al., "Fundamentals of Extracting Species From Soils by Electrokinetics,"Waste Mngmnt., vol. 13, pp. 141–151 (1993).

Segall et al., "Electroosmotic Contaminant-Removal Process," ASCE J. Env. Eng., vol. 118, pp. 84–100 (1992) describe an attempt to use electroosmosis to inject nutrients and process additives for the in situ bioremediation of soils. The objective of these workers was to inject species into soil pores by placing appropriate additives in the anode compartment of an electroosmosis apparatus. They reported a series of experiments in which solutions of phosphate and/or nitrate were placed in the anode reservoirs. Clay and soil mixtures were prepared with distilled water. Although about 50 mg/l of nitrate was fed at the anode for a period of 154 days, nitrate never appeared in substantial quantity in the effluent at the cathode, only about 1.5 mg/l nitrate. The difference between initial and effluent nitrate concentrations was apparently accounted for by undesired ammonia gas generation. Another test was reported in which phosphate was introduced in the anode compartment. Transport of the phosphate through the soil was also quite slow.

Segall et al. also reported on a second standard Kaolin column, fitted with graphite electrodes, and fed a solution of 150 mg/l nitrate at the anode for a period of 48 days. Effluent ammonia concentrations varied from 0.7 mg/l after displacement of one pore volume, to about 40 mg/l after 5 pore volume displacements. Nitrate introduced in the influent water at the anode was reduced in the electrochemical cell to ammonia, but was not transported as nitrate in significant quantities. In describing a related experiment, the same authors reported that electroosmosis did not facilitate sufficient phosphorous transport through fine-grained soils, even when feed water (anode) phosphate concentrations were far in excess of bacterial nutrient requirements. The inability to move phosphate was reported to be a substantial constraint on the potential for in situ biological treatment of organic contaminants.

Thus the prior work has reported great difficulty in transport of anions (other than hydroxyl) through soil by electroosmotic means.

2. Stabilizing chemicals have been pumped into soils to help stabilize them. For example, soils may be strengthened by bonding with a cementing agent. Cementing agents have mainly been added in the form of grouts that penetrate pores in the soil. The most common chemical grouts are silicates, lignins, resins, acrylamides, and urethanes. Silicates account for over 90% of chemical grouts used in soil stabilization. Representative examples of cementing reactions include the following:

$Na_2SiO_3.2H_2O+2HCl \rightleftharpoons 2NaCl+SiO_2.3H_2O$

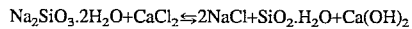

$Na_2SiO_3.2H_2O+CaCl_2 \rightleftharpoons 2NaCl+SiO_2.H_2O+Ca(OH)_2$

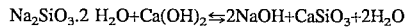

$Na_2SiO_3.2H_2O+Ca(OH)_2 \rightleftharpoons 2NaOH+CaSiO_3+2H_2O$

Silica gel, $SiO_2.nH_2O$, is a viscous, jelly-like substance that slowly solidifies into silica, and that has low solubility in water.

In a "two shot" system, different components of the cementing reaction are injected at different times. For example, a first injection of sodium silicate might be followed by injection of calcium chloride to produce the second reaction above. Other examples of two shot systems are the injection of $CO_2$ gas into loess soils; or the injection of ammonia gas into loess deposits, causing the replacement of calcium ions by ammonium—the liberated calcium then combines with water to form calcium hydroxide, which in turn can act as a cement stabilizer. Addition of 3–4% lime ($Ca(OH)_2$) can also help increase soil strength in a cementing reaction.

Other reactions are also possible. Acids can dissolve carbonates and silicates, and reprecipitate solid binders between soil particles. For example, phosphoric acid with wetting agents can be added to soils to produce an amorphous aluminum phosphate binder. Aluminum sulfate has been used also to improve high plasticity clays.

Oldham et al., *Materials Evaluated as Potential Soil Stabilizers*, Misc. Paper S-77-15, U.S. Army Engineer Waterways Experiment Station, pp. A7, A9, A132, A137, A189, and A194 (1977) reported that a combination of different chemical stabilizing agents gave better results than the individual agents alone. For example, 5% phosphoric acid was reported to be more effective with 0.5% sodium fluorosilicate added. Lime was more effective as 4% hydrated lime with 1% sodium sulfate, or as 2.5% hydrated lime with 2.5% calcium hydroxide additive. Other combinations that have been reported include 5% lime with 2% sodium metasilicate, and 1.25% magnesium sulfate.

Sutton et al., "Soil Improvement Committee—Admixtures Report," pp. 121–125, 128–135, in Welsh (ed.) *Soil Improvement—A Ten Year Update* (1987) discuss both the use of phosphoric acid, and the use of iron and aluminum oxides as cementing agents.

van Impe, *Soil Improvement Techniques and Their Evolution*, A. A. Balkema/Rotterdam/Brookfield, pp. 42–47, 89, 91, and 93 (1989) discloses that soils can be stabilized by the admixture of such materials as cement, CaO, $Ca(OH)_2$, or $CaSO_4$; or by the injection of liquid grouts.

Although chemical stabilization techniques can be cost-effective, the introduction of chemical stabilization agents into a heterogeneous deposit has not been easily accomplished. Chemical species injected by hydraulic methods tend to follow paths of high permeability deposits, resulting in "short-circuiting" and inefficient stabilization. It has similarly been difficult to transport chemical species into clays at all, due to their low hydraulic conductivity.

It has been unexpectedly discovered that suitable electrolyte conditioning at the electrodes greatly facilitates the transport of desired ions through the soil, enhancing the ability of electrokinetic processes to stabilize the soil through cementing reactions. Cationic species are injected at the anode, and anionic species at the cathode, with suitable electrolyte conditioning. For example, if acid or base formation negatively affects transport, chemical conditioning is used to neutralize the acid or base products of electrolysis. Although this invention is easy to carry out, no one has previously suggested a way to overcome the hurdles the prior art encountered in the transport of desired ionic species through soil via electrokinetic means. Using the techniques of this invention, ionic species can be transported through soil at rates of several centimeters a day, even in soils such as clays having a low hydraulic conductivity.

For example, when anions and cations are placed in the vicinity of the anode, and electroosmotic transport prevails in the porous medium, cations are transported from the anode to the cathode both by electroosmosis and electromigration. Because the directions of both transport mechanisms are the same (i.e., from the anode to the cathode), cation transport from anode to the cathode is enhanced by the combined effects of both electroosmosis and electromigration. By contrast, for anions the direction of transport by electromigration is from the cathode to the anode, while electroosmotic transport will be from the anode to the cathode. Because the electroosmotic transport rate is less than the transport rate by electromigration, anions placed in the anode compartment will only travel toward the anode relatively slowly. Cations move in the porous media towards the cathode, and anions within the porous media move towards the anode by electromigration to preserve electrical neutrality.

Similarly, when chemical species are placed in the vicinity of the cathode, anions tend to move from the anode towards the cathode by electromigration, while electroosmotic transport acts against such transport. However, anions are still transported efficiently from the cathode towards the anode because the transport rate by electroosmosis is in general lower than the transport rate by electromigration. Furthermore, electroosmotic transport can be minimized by appropriate conditioning of the pore fluid chemistry. For example, placement of chemical conditioners with smaller cations at the anode compartment and larger anions at the cathode compartment, or increasing the ion content of the pore fluid (e.g. by acidification) can help minimize electroosmotic transport and any of its adverse effects on species transport.

The cations and anions used are preferably selected to form cementatious precipitates in the soil. Thus when cationic species are injected at the anode and anionic species are injected at the cathode, stabilization reactions can prevail in the soil as the result of cross-transport of species, and a homogenous and uniform cementation and stabilization can be achieved in a short time.

For example, to neutralize acid formed at the anode and the hydrogen ions that can interfere with cation transport, basic electrolytes containing the desired cations may be introduced at the anode. For example, such electrolytes might contain one or more of $Ca(OH)_2$, $Mg(OH)_2$, NaOH, KOH, or $Al(OH)_3$. With competing $H^+$ ions neutralized by the introduced $OH^-$ anions, the desired cations will travel by ion migration, electroosmosis, or advection, allowing them better to be used in soil stabilization after transport.

As another example, to neutralize base formed at the cathode and the hydroxyl ions that can interfere with anion transport, acidic electrolytes containing the desired anions may be introduced at the cathode. For example, such electrolytes might contain one or more of $H_2SO_4$, $H_3PO_4$, $H_2CO_3$, $H_2SiO_3$, or $H_2SiF_6$. (Although $H_2SiO_3$ is insoluble in water, it could still be useful as a dry powder added as a depolarizer.) With competing $OH^-$ ions neutralized by the introduced $H^+$ cations, the desired anions will travel by ion migration, electroosmosis, or advection, allowing them better to be used in soil stabilization after transport.

In a preferred embodiment, both of the above techniques are used—i.e., conditioning of the electrolyte at both the anode and the cathode. The two processes may be run simultaneously or sequentially.

In one embodiment of the present invention, the soil is saturated with a cation such as $Ca^{2+}$ introduced at the anode in the presence of $OH^-$, and the cation migrates through the soil until it reaches the vicinity of the cathode compartment. Then, a solution containing an anion such as $SO_4^{-2}$ is introduced at the cathode in the presence of $H^+$, and the anion migrates through the soil and reacts with the cationic species to cause cementing reactions with the soil.

While this technique may be used in all soil types, it is expected to be most cost-efficient for heterogenous deposits and fine-grained soils.

Although ion exchange mechanisms alone can decrease the swelling characteristics of a treated soil, the present invention allows the strength of the treated soil to be enhanced considerably through cementation of the deposit. For example, cementation can occur through injection and precipitation of appropriate inorganic ions: e.g., sulfates, carbonates, and silicates. When the anode species is then gradually changed to, e.g., calcium hydroxide, calcium (or other salts) are precipitated from the pore fluid. Because precipitation often predominates at contact points between adjacent particles, the resulting cementation substantially increases shear strength and other engineering characteristics.

Some injected species will precipitate and react quickly, while others could gradually react with the soil pore fluid to produce cementatious products over time.

An alternative would be to use surfactants and micelles to transport nonpolar species, such as organic compounds, into the soil—species that would otherwise not migrate sufficiently under an electric field. Once in the soil, the nonpolar species could then react with the soil constituents to stabilize the deposits. Such nonpolar species might include, for example, lignins, resins, or adhesives known in the art.

Brief Description of the Drawings FIG. 1 illustrates the change in ammonium ion concentration across a soil specimen over time.

Figure 2:
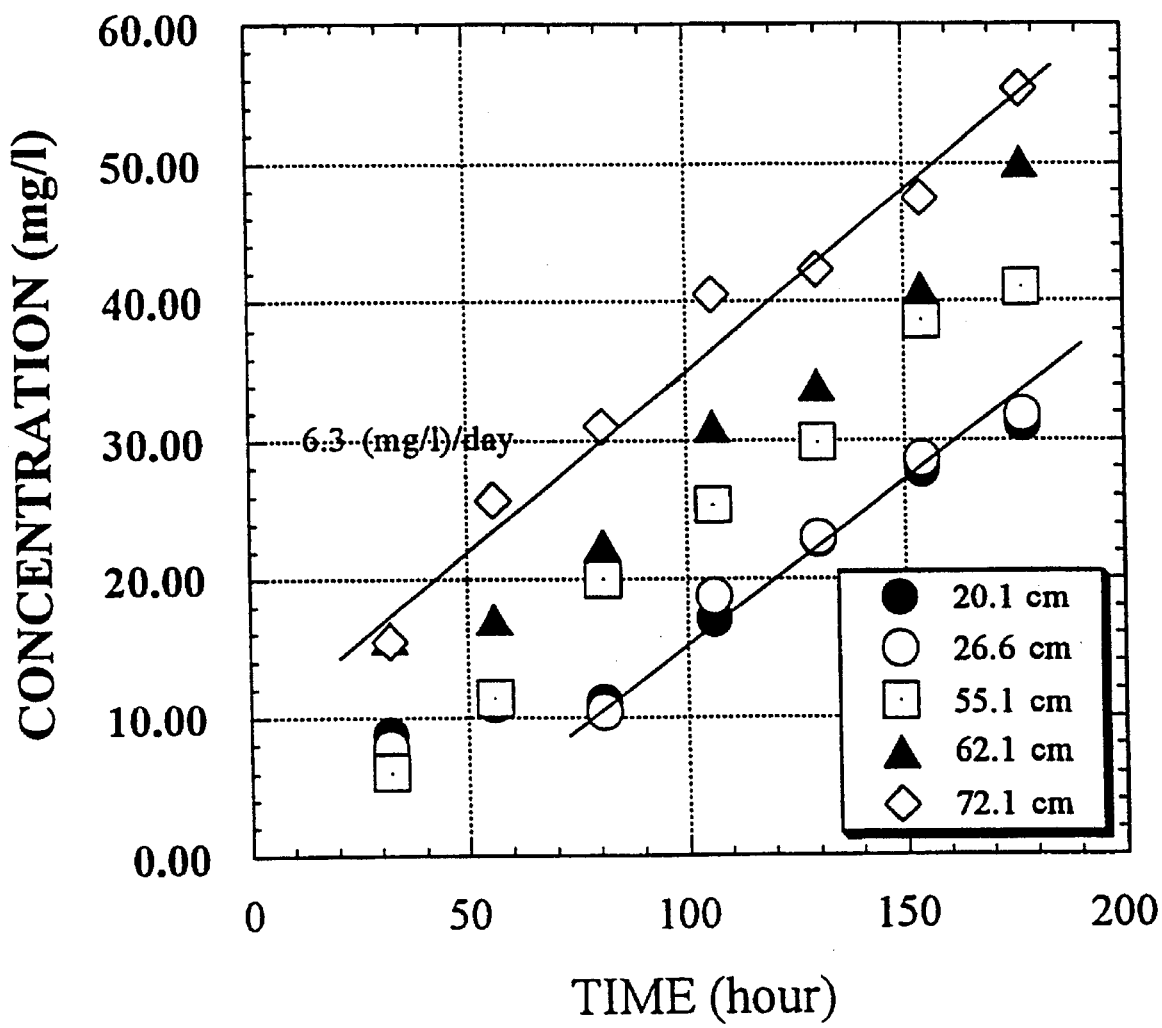

FIG. 2 illustrates the change in sulfate ion concentration across a soil specimen over time.

A comparison of the diffusion coefficients, $D_j$, and ionic mobilities, $u_j$, for some ionic species are presented in Table 1 for a voltage gradient of 1 V/cm. The effective ionic mobilities, $u_j^*$, of these species in a soil with a typical porosity of 0.6 and an average tortuosity of 0.35 are also presented.

TABLE 1

Diffusion coefficient, ionic mobility at infinite dilution, and effective ionic mobility in soil for selected ionic species under a voltage gradient of 1 V/cm

| Species | $D_j(cm^2/d)$ [$(cm^2/d)$/(V/cm)] | $u_j$(cm/d) [$(cm^2/V\text{-}d)/(V/cm)$] | $u_j^*$ (cm/d) [$(cm^2/V\text{-}s)/(V/cm)$] |
|---|---|---|---|
| $H^+$ | 8.0 | 313.2 | 65.7 |
| $Na^+$ | 1.1 | 44.8 | 9.4 |
| $Ca^{+2}$ | 0.7 | 53.3 | 11.2 |
| $Cd^{+2}$ | 0.8 | 63.6 | 13.4 |
| $Pb^{+2}$ | 0.6 | 48.4 | 10.2 |
| $Cr^{+3}$ | 0.5 | 60.0 | 12.6 |
| $OH^-$ | 4.6 | 177.8 | 37.3 |
| $NO_3^-$ | 1.6 | 20.7 | 13.4 |
| $CO_3^{-2}$ | 0.9 | 64.5 | 13.5 |
| $PO_4^{-2}$ | 0.5 | 61.8 | 13.0 |
| $SO_4^{-2}$ | 1.0 | 35.7 | 7.5 |

Note in particular the substantially higher mobilities of $H^+$ and $OH^-$ compared to the mobilities of the other ions. These ions have specifically high mobilities due both to their small size, and also to their rapid dissociation and association with water molecules. In other words, unlike most other ions $H^+$ and $OH^-$ can migrate by rapid "conduction" through a series of water molecules. Because the effective ionic mobility of the $H^+$ ion is about 1.8 times the mobility of $OH^-$ ion, the activity of the proton dominates the system. While fluid flow under hydraulic gradients is significantly affected by the soil fabric and macrostructure, electroosmotic flow under an electric field depends primarily on the porosity and the zeta potential of the soil, and is largely independent of the pore size distribution or the presence of macropores. Electroosmosis is therefore an efficient method for uniform fluid and mass transport in fine grained deposits. The relative contribution of electroosmosis and ion migration to the total mass transport varies by soil type, water content, type of species transported, pore fluid concentration, and processing conditions. When the electro-osmotic coefficient of permeability, $k_e$, is high (on the order of $10^{-4}$ cm$^2$/V–s; e.g., in a low activity clay with a high water content and low electrical conductivity), mass flux by electromigration is of the same order of magnitude as mass flux by electro-osmotic advection for ionic species other than $H^+$ and $OH^-$.

Ionic species can be transported across soil at rates of several cm per day under a potential gradient on the order of 1 V/cm. The electrode reactions are manipulated by injecting conditioning species. For example, depolarizing the anode reaction with calcium hydroxide, while depolarizing the cathode reaction with sulfuric acid results in the accumulation of calcium sulfate in the pore fluid. A similar approach will generate other desired species that will precipitate within the soil medium.

Preliminary experiments have been carried out to determine the transport rates of ammonium ($NH_4^+$) and sulphate/ bisulfate ($SO_4^{2-}/HSO_4^-$) ions under an electrical field across a bed of compacted fine silty sand. These species were transported at rates of 9.1 to 18.4 cm/day under a voltage gradient of 1 V/cm. A box formed of acrylic materials was constructed in the shape of a rectangular parallelopiped 120 cm long, 20 cm wide, and 60 cm deep. Soil was contained within 80 cm of the length; the final 20 cm on either end being the electrode compartments. The front and the back acrylic panels had openings for the placement of sampling ports and voltage probes, respectively. The electrode chambers were connected to a fluid circulation system, which circulated fluid from the chambers to outside containers in which the pore fluid chemistry was controlled. The anolyte and the catholyte were each cycled through the containers over the course of about one hour. A pump with a pH controller was connected to the containers to maintain the pH at 7. $NH_4OH$ solution was added to the anolyte container, and $H_2SO_4$ solution was added to the catholyte container as needed to maintain a pH of 7 in each. The anode electrolysis reaction was thus neutralized by hydroxyl ions from the ammonium hydroxide solution, and the cathode electrolysis reaction was neutralized by hydronium ions from sulphuric acid. The result was that ammonium ions were transported from the anode towards the cathode, while sulphate ions were transported from the cathode towards the anode.

The concentrations of ammonium and of sulfate in the compacted silty sand bed were measured through intermittent sampling of the pore fluid. Corresponding voltage probes measured the electric potentials at the same approximate locations from which the samples were removed for measurement.

To try to reach final concentrations of the species on the order of 100 mg/l or less across the soil bed, a constant current density of 15 µA/cm$^2$ was used. Bulk conductivity across the soil was about 14 µS/cm, giving an initial voltage gradient of 1.1 V/cm. Ionic conductivity across the soil mass increased over time as the ammonium ions were transported from the anode compartment to the cathode compartment, and the sulphate ions were transported from the cathode compartment towards the anode compartment. Because constant current conditions were maintained, the result was a decrease in the electrical potential gradient across the soil mass over time to about 0.30 V/cm, implying that bulk conductivity increased by a factor of about three. Most of the decrease in potential gradient occurred within the first 10 days, during which the medium was saturated with the injected ions.

The change in the ammonium concentration across the soil specimen over time is illustrated in FIG. 1. The concentration increased about 3 mg/l per day for the first six to eight days, after which approximate steady-state conditions were reached. An average transport rate of about 6.4 cm/day was observed. The corresponding voltage gradient ranged between 1.1 V/cm and about 0.35 V/cm. With an average voltage gradient of about 0.70 V/cm, the effective ionic mobility of the ammonium ion was about 9.1 (cm/day)/ (Volt/cm). This figure implies that the ammonium ion could be transported at a rate of about 10 cm/day in this silty sand at currents as low as about 15 µA/cm$^2$.

Analogous measurements of sulfate concentrations across the specimen over time are presented in FIG. 2. The increase in sulfate concentration at a port was about 6.3 (mg/l)/day, while the transport rate for the sulfate (and/or bisulfate ion) was about 12.8 cm/day. The corresponding effective ionic mobility was approximately 18.4 (cm/day)/(V/cm). The higher effective ionic mobility for the sulfate ion is due both to that ion's higher ionic mobility, and also anion exclusion from the negatively charged soil surfaces.

Concentration profiles obtained across ports along the depth of the specimen demonstrated that both the ammonium and the sulfate were homogeneously transported across the medium.

These experiments are being repeated in a clay, namely Georgia kaolinite. Preliminary results in the clay suggest that the technique will be quite efficient in clay soils as well.

The anode conditioning fluid may contain, as preferred species, one or more of the following cations: $H^+$, $Ca^{++}$, $Fe^{++}$, $Fe^{+3}$, $Mg^{++}$, $Al^{+3}$ (or an oxyanion containing Al), any of the alkali metal cations, any of the alkaline earth cations, $NH_4^+$, or alkyl ammonium cations.

The cathode conditioning fluid may contain, as preferred species, one or more of the following anions: $OH^-$, $SO_4^{-2}$, $PO_4^{-3}$, $CO_3^{-2}$, $SiO_3^{-2}$, $SiF_6^{-2}$, oxyanions containing sulfur, oxyanions containing phosphorous, oxyanions containing silicon, fluoroanions containing sulfur, fluoroanions containing phosphorous, or fluoroanions containing silicon.

To prevent undesirable precipitation of ions only along a single "boundary" layer, injection of ions may be alternated. For example, soil could first be saturated with the cation of interest, such as calcium. An anion is selected that will precipitate with the chosen cation, such as sulfate in the case of calcium. Injection of the artion begins as the cation front approaches the cathode compartment, causing precipitation. At about the same time, the injected cation is changed to one that would not precipitate with the artion, such as ammonium ion or sodium in the case of sulfate. When the "new" cation moves, the artion can then precipitate with the "old" cation as it migrates towards the anode. These alternating steps can be repeated as needed.

Pre-electrolysis with alternating current may in some cases be useful to demobilize or remove certain materials by irreversible reactions.

A direct electrode/soil contact is not essential for the process. For example, a trench of solution or ground water may be used to provide electric contact between the electrode and the soil.

The process need not be carried out with a single anode and a single cathode. In large-scale applications, the use of multiple electrodes inserted in the soil at different locations will be preferred.

The entire disclosures of all references cited in the specification are hereby incorporated by reference in their entirety. In the event of an otherwise irresolvable conflict, however, the present specification shall control.

We claim:

1. A process for strengthening a soil by the addition of a cementing agent comprising an anion and a cation, wherein the combination of the anion and cation in the soil forms a cementitious product, wherein said process comprises the steps of:

(a) applying an electric field in the soil between an anode and a cathode;

(b) supplying water to the soil near the anode;

(c) introducing the cation to the soil near the anode, whereby the cation migrates through the soil in the direction from the anode towards the cathode;

(d) introducing the anion to the soil near the cathode, whereby the anion migrates through the soil in the direction from the cathode towards the anode; and (e) either introducing a base to the soil near the anode to neutralize protons generated by electrolysis of water at the anode; or introducing an acid to the soil near the cathode to neutralize hydroxide generated by electrolysis of water at the cathode; or both;

whereby the cation and the anion are dispersed through the soil between the anode and the cathode, and whereby the combination of the anion and cation in the soil forms a cementitious product.

2. A process as recited in claim 1, additionally comprising the step of supplying water to the soil near the cathode.

3. A process as recited in claim 1, wherein the cation comprises $H^+$, $Ca^{++}$, $Mg^{++}$, $Fe^{++}$, $Fe^{+3}$, $Al^{+3}$, or $NH_4^+$.

4. A process as recited in claim 1, wherein the anion comprises $OH^-$, $SO_4^{-2}$, $PO_4^{-3}$, $CO_3^{-2}$, $SiO_3^{-2}$, $SiF_6^{-2}$.

5. A process as recited in claim 1, wherein said steps of introducing the cation and introducing the anion are performed simultaneously.

6. A process as recited in claim 1, wherein said steps of introducing the cation and introducing the anion are performed on an alternating basis.

7. A process as recited in claim 1, wherein the cation comprises $Ca^{++}$, and wherein the anion comprises $SO_4^{-2}$.

8. A process as recited in claim 1, wherein the cation comprises an oxyanion containing aluminum, an alkali metal cation, an alkaline earth cation, or an alkyl ammonium cation.

9. A process as recited in claim 1, wherein the anion comprises an oxyanion containing sulfur, an oxyanion containing phosphorous, an oxyanion containing silicon, a fluoroanion containing sulfur, a fluoroanion containing phosphorous, or a fluoroanion containing silicon.

* * * * *